US009199327B2

(12) United States Patent
Xu et al.

(10) Patent No.: US 9,199,327 B2
(45) Date of Patent: Dec. 1, 2015

(54) PORTABLE IGBT ARC WELDING MACHINE

(71) Applicant: SHENZHEN JASIC TECHNOLOGY DEVELOPMENT CO., LTD, Shenzhen (CN)

(72) Inventors: Aiping Xu, Shenzhen (CN); Lei Pan, Shenzhen (CN); Bo Xiao, Shenzhen (CN)

(73) Assignee: SHENZHEN JASIC TECHNOLOGY CO., LTD., Shenzhen (CN)

( * ) Notice: Subject to any disclaimer, the term of this patent is extended or adjusted under 35 U.S.C. 154(b) by 315 days.

(21) Appl. No.: 13/752,394

(22) Filed: Jan. 29, 2013

(65) Prior Publication Data

US 2014/0209586 A1 Jul. 31, 2014

(51) Int. Cl.
| | |
|---|---|
| *B23K 9/10* | (2006.01) |
| *B23K 9/09* | (2006.01) |
| *H02M 3/335* | (2006.01) |
| *H02M 1/00* | (2007.01) |

(52) U.S. Cl.
CPC ............... *B23K 9/091* (2013.01); *B23K 9/1043* (2013.01); *H02M 3/3353* (2013.01); *H02M 2001/007* (2013.01)

(58) Field of Classification Search
CPC ............ F03B 3/04; F03B 3/18; F03B 13/083; H02K 1/148; H02K 1/278; H02K 5/08; H02K 5/12; H02K 7/086; H02K 7/088; H02K 7/14; H02K 7/1823; H02K 11/0073; H02K 11/0094; H02K 11/046; H02K 5/20; H02K 9/19; H02K 2213/12; H02K 1/185; H02K 7/145; Y02E 10/223; Y02E 10/22; B24B 23/028; B24B 47/12; B25F 5/02; B23K 9/1006; B23K 9/10; B23K 9/1043; B23K 9/091; H02M 3/3353; H02M 2001/007
See application file for complete search history.

(56) References Cited

U.S. PATENT DOCUMENTS

| | | | | |
|---|---|---|---|---|
| 5,406,051 | A | * | 4/1995 | Lai .............................. 219/130.1 |
| 5,444,356 | A | * | 8/1995 | Reynolds et al. .............. 323/282 |
| 5,615,095 | A | * | 3/1997 | Reynolds et al. ........... 363/56.02 |
| 5,710,696 | A | * | 1/1998 | Reynolds et al. ................ 363/37 |
| 5,747,972 | A | * | 5/1998 | Baretich et al. ................ 323/223 |
| 6,023,037 | A | * | 2/2000 | Church et al. ............ 219/121.39 |
| 6,055,161 | A | * | 4/2000 | Church et al. ................... 363/22 |
| 6,091,612 | A | * | 7/2000 | Blankenship ................... 363/45 |
| 6,115,273 | A | * | 9/2000 | Geissler ........................... 363/89 |
| 6,177,645 | B1 | * | 1/2001 | Church et al. ............ 219/121.39 |

(Continued)

*Primary Examiner* — Eric Stapleton
(74) *Attorney, Agent, or Firm* — Hamre, Schumann, Mueller & Larson, P.C.

(57) ABSTRACT

A portable IGBT (Insulated Gate Bipolar Transistor) of high reliability, compact size, and low cost includes a main circuit to which a control circuit and an auxiliary power supply circuit are connected. The main circuit includes, in sequence, an input rectifier filter circuit, an inverter circuit, a high-frequency primary transformer, and a secondary output rectifier circuit. The control circuit includes a PWM regulation circuit, an IGBT driving circuit, a current feedback circuit, and a current setup circuit. The inverter circuit includes a full-bridge hard switching structure, which has IGBTs constituting bridge arms that are sequentially conducted, so that their alternating conduction converts direct current into high frequency square wave alternating current, which flows through the high-frequency primary transformer and is then subjected to rectification to supply an output of low voltage direct current. Each IGBT is connected in parallel to resistor and capacitor, which constitute a peak voltage absorption circuitry.

2 Claims, 6 Drawing Sheets

(56) References Cited

U.S. PATENT DOCUMENTS

| | | | |
|---|---|---|---|
| 6,266,257 B1* | 7/2001 | Geissler | 363/56.05 |
| 6,286,609 B1* | 9/2001 | Carrier et al. | 173/1 |
| 6,426,888 B2* | 7/2002 | Geissler | 363/89 |
| 6,504,132 B1* | 1/2003 | Church | 219/130.1 |
| 6,625,046 B2* | 9/2003 | Geissler | 363/89 |
| 6,865,096 B1* | 3/2005 | Geissler | 363/89 |
| 7,336,512 B2* | 2/2008 | Geissler | 363/89 |
| 7,710,081 B2* | 5/2010 | Saban et al. | 322/89 |
| 7,719,092 B2* | 5/2010 | Takubo | 257/659 |
| 7,911,816 B2* | 3/2011 | Miramonti | 363/97 |
| 7,960,948 B2* | 6/2011 | Saban et al. | 322/89 |
| 8,063,593 B2* | 11/2011 | Mullin | 318/400.01 |
| 8,067,911 B2* | 11/2011 | Mullin | 318/400.01 |
| 8,067,912 B2* | 11/2011 | Mullin | 318/400.1 |
| 8,183,726 B2* | 5/2012 | Rittenhouse | 310/68 R |
| 8,269,141 B2* | 9/2012 | Daniel et al. | 219/130.1 |
| 8,581,147 B2* | 11/2013 | Kooken et al. | 219/137.7 |
| 8,785,816 B2* | 7/2014 | Kooken et al. | 219/130.1 |
| 2001/0026458 A1* | 10/2001 | Geissler | 363/16 |
| 2002/0047268 A1* | 4/2002 | Leijon et al. | 290/7 |
| 2002/0191425 A1* | 12/2002 | Geissler | 363/44 |
| 2005/0185432 A1* | 8/2005 | Geissler | 363/89 |
| 2006/0011595 A1* | 1/2006 | Daniel et al. | 219/130.1 |
| 2006/0213890 A1* | 9/2006 | Kooken et al. | 219/130.21 |
| 2006/0226130 A1* | 10/2006 | Kooken et al. | 219/130.1 |
| 2006/0284211 A1* | 12/2006 | Takubo | 257/177 |
| 2007/0051712 A1* | 3/2007 | Kooken et al. | 219/130.1 |
| 2008/0103632 A1* | 5/2008 | Saban et al. | 700/286 |
| 2008/0115527 A1* | 5/2008 | Doty et al. | 62/498 |
| 2008/0298102 A1* | 12/2008 | Geissler | 363/89 |
| 2009/0128067 A1* | 5/2009 | Mullin | 318/400.01 |
| 2009/0128068 A1* | 5/2009 | Mullin | 318/400.01 |
| 2009/0209128 A1* | 8/2009 | Mullin | 439/502 |
| 2010/0244599 A1* | 9/2010 | Saban et al. | 310/71 |
| 2011/0285328 A1* | 11/2011 | Rittenhouse | 318/3 |
| 2012/0146437 A1* | 6/2012 | Kernahan | 310/71 |
| 2012/0305535 A1* | 12/2012 | Daniel et al. | 219/130.1 |
| 2013/0164013 A1* | 6/2013 | Kondo | 399/67 |
| 2013/0293163 A1* | 11/2013 | Flett | 318/139 |
| 2014/0340004 A1* | 11/2014 | Flett | 318/139 |

* cited by examiner

PORTABLE IGBT ARC WELDING MACHINE

(a) TECHNICAL FIELD OF THE INVENTION

The present invention generally relates to an inverter arc welding machine, and more particularly to a portable IGBT (Insulated Gate Bipolar Transistor) inverter arc welding machine.

(b) DESCRIPTION OF THE PRIOR ART

Conventional small-sized arc welding machines often use power field effect transistor to serve as primary switching components. Consequently, the conventional inverter arc welding machine suffers the following disadvantages. The first one is that due to the constraint that a single transistor does not provide a large current, the welding machine requires multiple transistors connected in parallel, whereby the chance that the welding machine malfunctions is increased. The second one is that due to the frequency of inversion being high, the transistor and fast recovery diode generate great heat and further due to the constraint imposed by the structure of the primary transformer, the heat cannot be quickly dissipated, whereby although frequency of inversion is high, a welding machine of the same current and same loading factor would require a much larger heat dissipater and fan, making it difficult to realize miniaturization. The third one is that due to the factors of large number of transistors used and large size of heat dissipater and fan, the cost is increased under the same parameters.

SUMMARY OF THE INVENTION

The objective of the present invention is to provide a portable IGBT inverter arc welding machine that is of high reliability, small size, and low cost.

To achieve the above objective, the technical solution adopted in the present invention comprises a portable IGBT inverter arc welding machine, which comprises:

a main circuit to which a control circuit and an auxiliary power supply circuit are connected;

the main circuit comprising, in sequence, an input rectifier filter circuit, an inverter circuit, a high-frequency primary transformer, and a secondary output rectifier circuit, the main circuit being adapted to rectify 50 Hz alternate current of electric main to form a direct current, which is then inverted into a high-frequency alternate current and further subjected to secondary rectification to form a direct current for welding operation;

the control circuit comprising a pulse width modulator (PWM) regulation circuit, an IGBT driving circuit, a current feedback circuit, and a current setup circuit, a user setting of welding current being current setup, the current setup being fed, together with a current feedback signal that is sampled through a flow divider, to a current regulator for comparison to provide a voltage difference therebetween, the voltage difference controlling the PWM regulation circuit to generate a pulse signal of a given width, the pulse being sent to the IGBT driving circuit to drive IGBTs of the main circuit, whereby a welding current can be supplied from the main circuit, and characterized in that the inverter circuit is formed of a full-bridge hard switching structure, wherein IGBTs G1, G3 and G2, G4 constitute bridge arms that are sequentially conducted, so that their alternating conduction converts direct current into high frequency square wave alternating current, which flows through the high-frequency primary transformer and is then subjected to rectification to supply an output of low voltage direct current, each IGBT being connected in parallel to a resistor and a capacitor, which constitute a peak voltage absorption circuitry;

the high-frequency primary transformer provides functions of power transmission and electrical isolation in the circuit, the high-frequency primary transformer comprising a microcrystalline alloy ferrite core, high voltage and high temperature resistance insulation layer being provided between primary and secondary sides; and the PWM regulation circuit comprises a dual output current control type pulse width modulator chip U2.

Preferably, the PWM regulation chip is a dual output current control type pulse width modulator chip U2, which has a model number of KA3846. The KA3846 chip adopts peak current control method to realize pulse by pulse control.

Preferably, the IGBT driving circuit is connection between IGBTs and the control circuit and realizes isolation, magnification, and protection for PWM signals.

According to the present invention, the inverter circuit is formed of a commonly used full-bridge hard switching structure and insulated gate bipolar transistors G1, G3 and G2, G4 constitute bridge arms that are sequentially conducted. The IGBT is a third-generation power element, which possesses the advantages of both a field effect transistor and a giant transistor GTR and shows the advantages of large capacity of each individual transistor, low switching loss and low heat generation, increased resistance against voltage, excellent thermal stability, and being easy to drive. Due to the advantages of IGBT, the present invention does not need parallel connection of multiple transistors and thereby improves the reliability of welding machine. Also, due to low heat generation, there is no need for a large-size heat dissipater and fan, thereby effectively reducing the overall size of the machine. The high-frequency primary transformer of the present invention adopts a microcrystalline alloy ferrite core and uses high voltage and high temperature resistance insulation materials for both the primary and secondary sides so as to provide the advantages of high power density, easy heat dissipation, and easy installation. The conversion from the direct current into the alternate current is an instantaneous inversion operation in which the frequency of the alternate current is extremely high, generally as high as tens of thousands Hertz. Due to such a high frequency, the turns of winding of the primary transformer is small and the ferrite core is small, making the welding machine compact in size and light in weight, and further, the loss of the transformer is made small, leading to enhanced overall efficiency. The dual output current control type pulse width modulator chip KA3864 of the present invention adopts a peak current mode control method. The current type control method shows the following advantages: (1) It provides pulse by pulse control, having fast dynamic response, high output precision, and excellent stability (2) It provides instantaneous protection to effectively prevent over current of IGBTs. (3) It prevents bias magnetism from occurring in the high-frequency primary transformer and severe bias magnetism may cause damage of IGBTs or even the primary transformer. Through use of KA3846, the present invention improves the working reliability of the whole machine. In summary, the present invention has reliable operation, compact size, and low cost.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
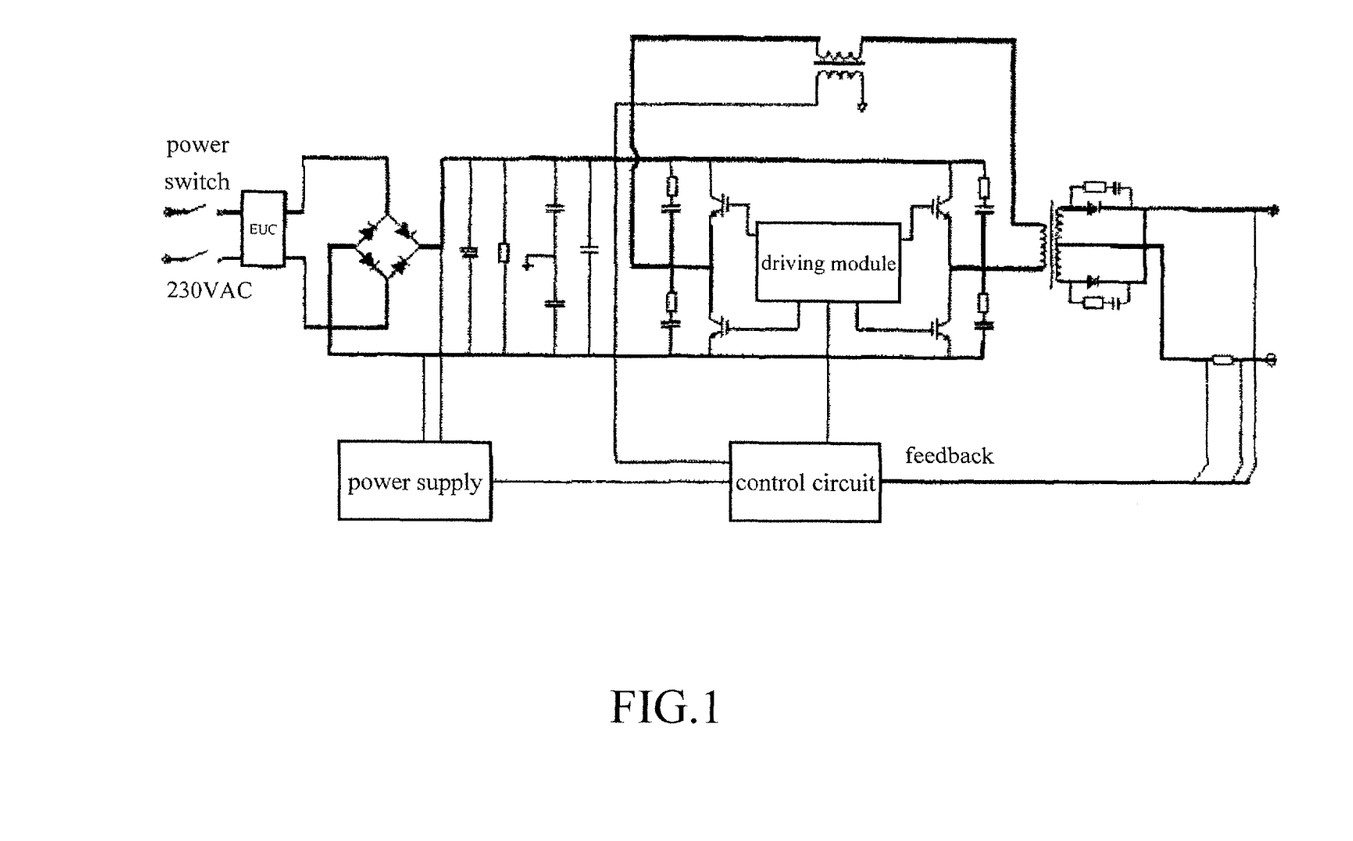
FIG. 1 is a circuit diagram of a machine according to the present invention, comprising a main circuit and associated circuit blocks.

As shown in FIG. 1, the present invention provides a novel portable IGBT (Insulated Gate Bipolar Transistor) inverter arc welding machine, which comprises a main circuit to which a control circuit and an auxiliary power supply circuit are connected. In FIG. 1, the main circuit is identified as the circuitry portion other than the blocks of control circuit, driving module, and auxiliary power supply circuit. The driving module comprises an IGBT driving circuit.

Figure 2:
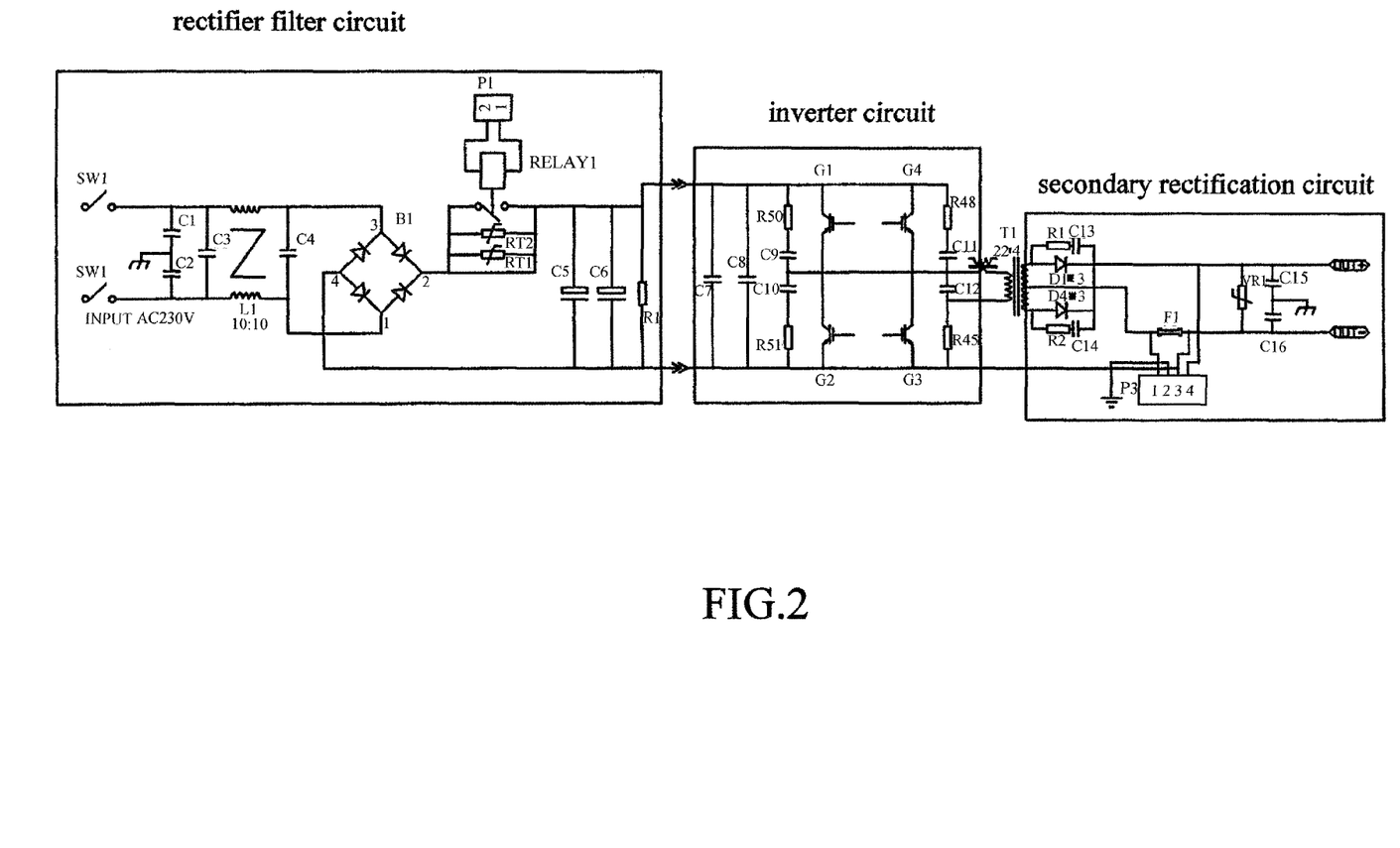
FIG. 2 is a circuit diagram of a main circuit shown in FIG. 1.

As shown in FIG. 2, the main circuit comprises, in sequence, an input rectifier filter circuit, an inverter circuit, a high-frequency primary transformer, and a secondary output rectifier circuit. The main circuit is the basic and most important portion of a welding machine and has a major function of converting an alternate current of commercial electric main into a direct current for welding operation. The main circuit is the main portion that realizes inversion and the inversion process rectifies the 50 Hz alternate current of the electric main into a direct current, which is then inverted into a high-frequency alternate current and further subjected to secondary rectification to form a direct current, wherein the conversion from the direct current into the alternate current is an instantaneous inversion operation in which the frequency of the alternate current is extremely high, generally as high as tens of thousands Hertz. Due to such a high frequency, the turns of winding of the primary transformer is small and the ferrite core is small, making the welding machine compact in size and light in weight, and further, the loss of the transformer is made small, leading to enhanced overall efficiency.

As shown in FIG. 2, the input rectifier filter circuit comprises a power switch, a rectification bridge, a switch-off surge limiting circuit, and a filter circuit that are connected together and serves to supply a stable DC voltage to the inverter circuit.

As shown in FIG. 2, the inverter circuit is formed of a commonly used full-bridge hard switching structure. IGBTs G1, G3 and G2, G4 constitute bridge arms that are sequentially conducted, whereby alternating conduction of them converts direct current into high frequency square wave alternating current, which flows through the high-frequency primary transformer and is then subjected to rectification to supply an output of low voltage direct current. The IGBT is connected in parallel to a resistor and a capacitor, which constitute a peak voltage absorption circuitry having a function of absorbing a peak voltage induced by leakage inductance of the primary transformer at the time when a switch transistor is switched off and thus protecting the IGBT from being damaged by over voltage. The present invention uses IGBTs to serve as primary switching elements. The IGBT is a third-generation power element, which possesses the advantages of both a field effect transistor and a giant transistor GTR and shows the advantages of large capacity of each individual transistor, low switching loss, increased resistance against voltage, excellent thermal stability, and being easy to drive. Due to the advantages, the present invention does not need parallel connection of multiple transistors and thereby improves the reliability of welding machine. Also, due to low heat generation, there is no need for a large-size heat dissipater and fan, thereby effectively reducing the overall size of the machine.

As shown in FIG. 2, the high-frequency primary transformer provides functions of power transmission and electrical isolation in the circuit. For a welding machine, it provides large power transmission, high heat generation, and requires extremely high insulation property, making it a component of vital importance and taking a large percentage of cost. The high-frequency primary transformer of the present invention adopts a microcrystalline alloy ferrite core and uses high voltage and high temperature resistance insulation materials for both the primary and secondary sides to provide the advantages of high power density, easy heat dissipation, and easy installation.

As shown in FIG. 2, the secondary output rectification circuit rectifies low voltage high frequency alternate current to form a direct current, which may then be used in welding operation. Since the frequency of the alternate current is very high so that fast recovery diodes are used.

Figure 3:
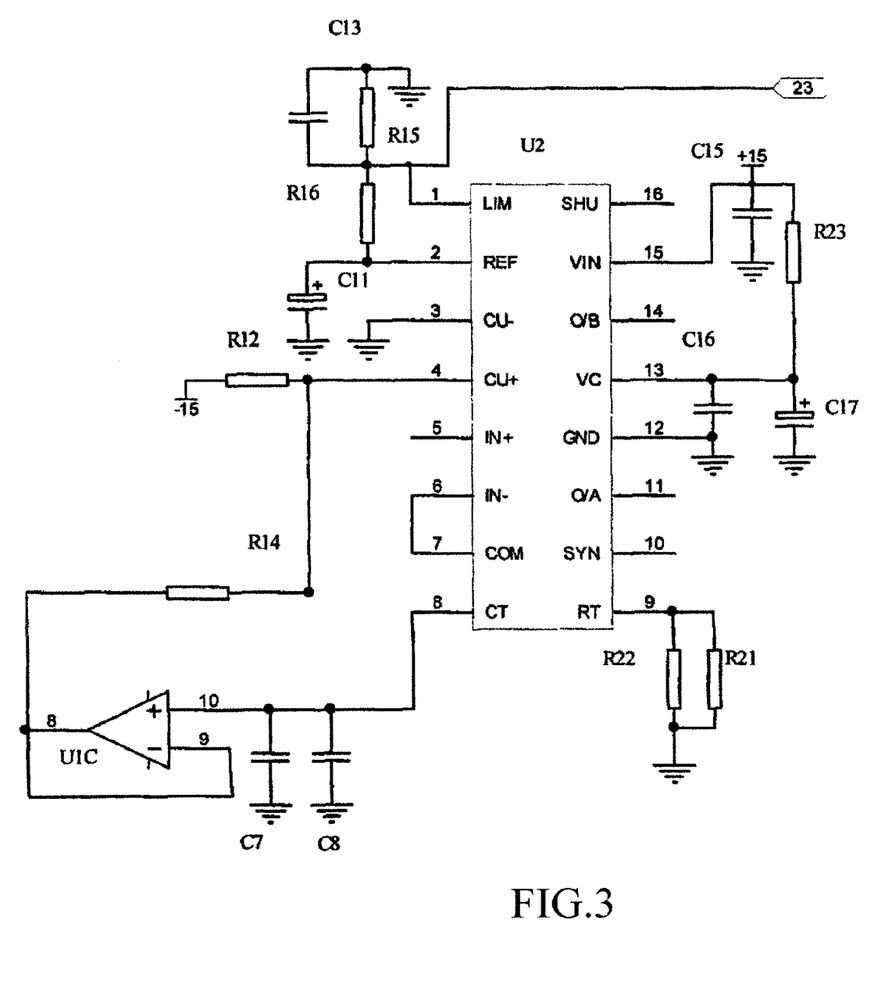
FIG. 3 is a circuit diagram of PWM regulation of a control circuit shown in FIG. 1.

The control circuit functions to control a welding process. The control circuit comprises PWM regulation, IGBT driving circuit, current feedback circuit, and current setup circuit. Current setup is a user setting the level of welding current, which is fed, together with a current feedback signal that is sampled through a flow divider, to the current regulator for comparison to provide a voltage difference therebetween. The voltage difference controls the PWM regulation circuit to generate a pulse signal of a given width. The pulse is sent to the IGBT driving circuit to drive the IGBTs of the main circuit, whereby a welding current can be supplied from the main circuit. The present invention provides a novel control circuit, which is composed of the following components, which will be separately described as follows:

As shown in FIG. 3, the PWM regulation circuit uses a PWM regulation chip U2 of which the model number is KA3846. This is a dual output current control type pulse width modulator chip. KA3864 adopts a peak current mode control method and the current type control method shows the following advantages: (1) It provides pulse by pulse control, having fast dynamic response, high output precision, and excellent stability. (2) It provides instantaneous protection to effectively prevent over current of IGBTs. (3) It prevents bias magnetism from occurring in the high-frequency primary transformer. Severe bias magnetism may cause damage of IGBTs or even the primary transformer. Through use of KA3846, the present invention improves the working reliability of the whole machine.

Figure 4:
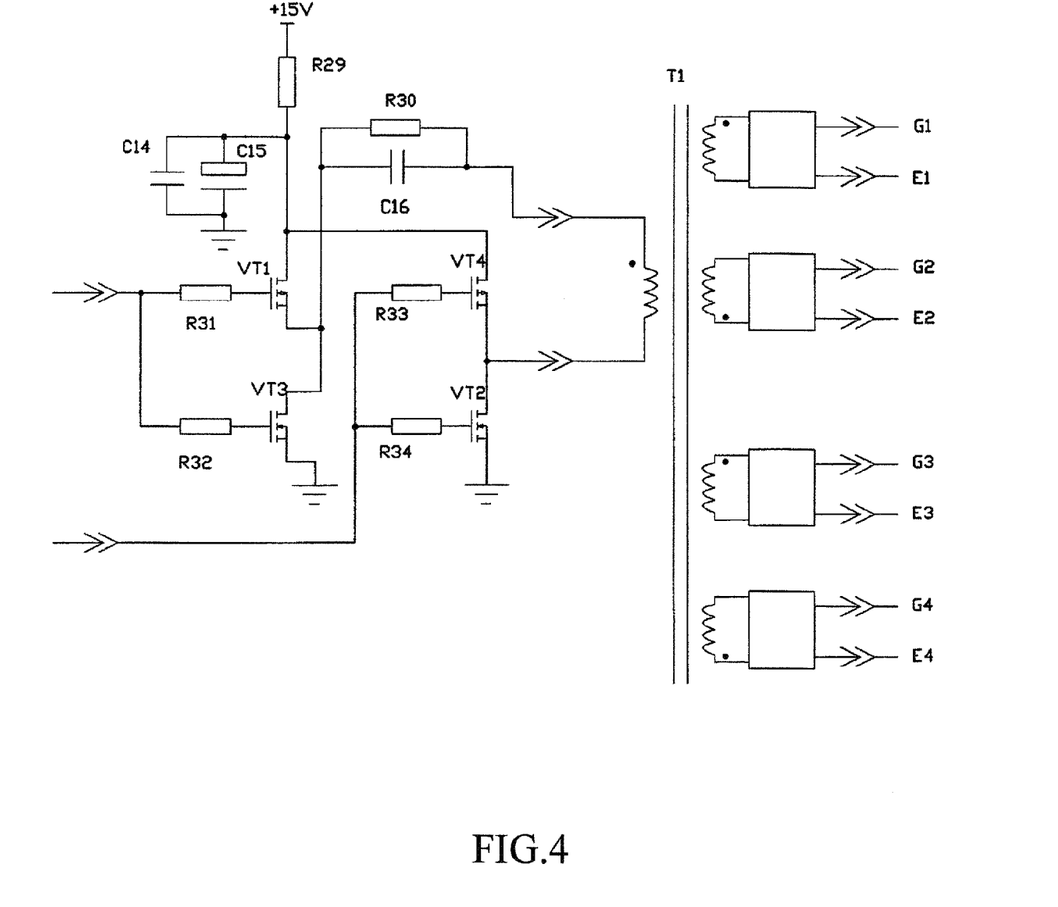
FIG. 4 is a circuit diagram of an IGBT driving circuit of the control circuit shown in FIG. 1.

As shown in FIG. 4, the IGBT driving circuit is connection between IGBTs and the control circuit (the driving module of FIG. 1 being the IGBT driving circuit) and realizes isolation, magnification, and protection for PWM signals. The driving circuit is of vital importance for normal operation of IGBTs. The present invention uses a driving transformer T1, which can effectively protect IGBTs from breakthrough damage and is cheap, thereby improving reliability and lowering cost.

Figure 5:
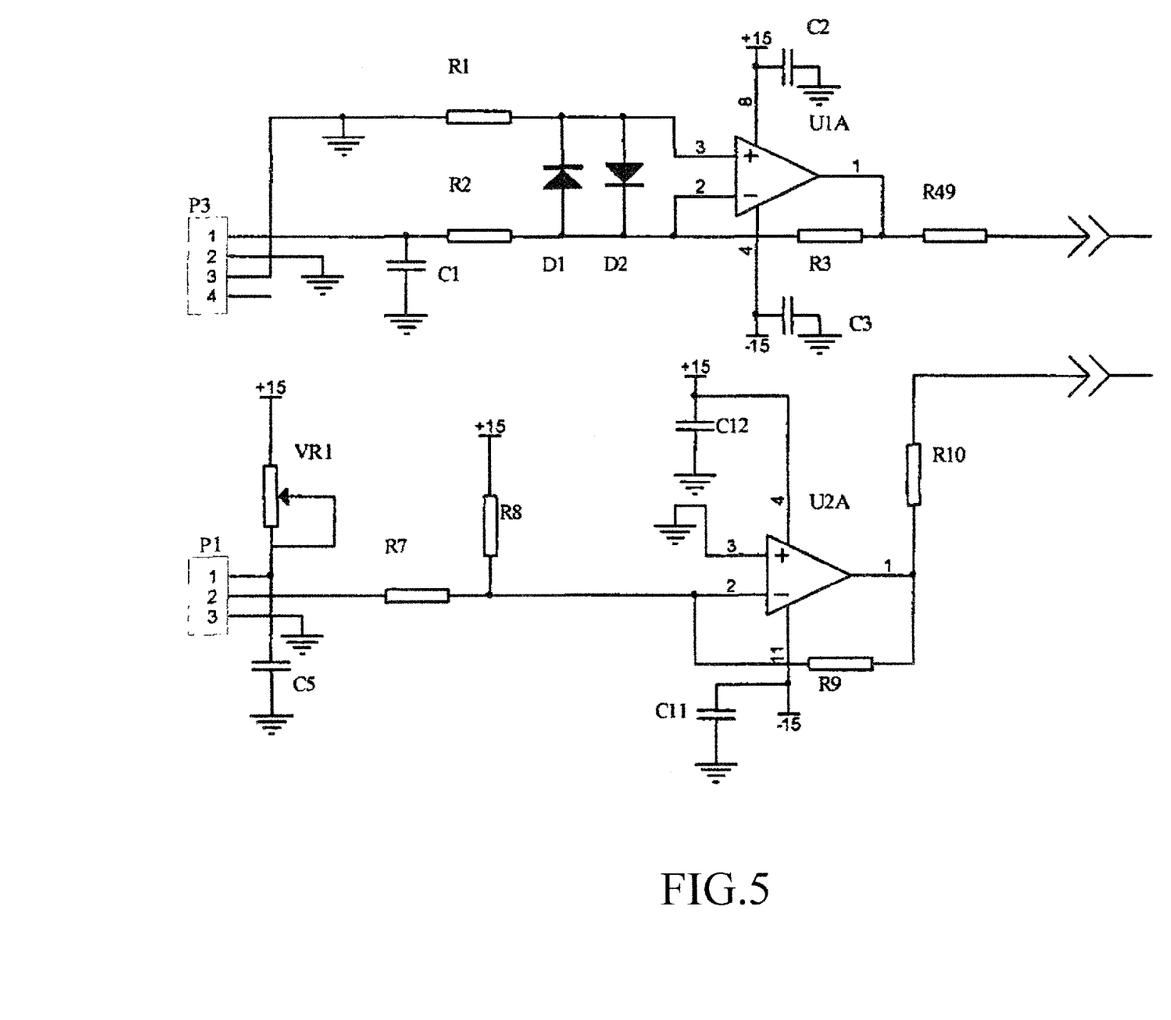
FIG. 5 is a circuit diagram of current feedback and current setup circuits of the control circuit of FIG. 1.

FIG. 5 shows the current feedback and current setup circuits. The present invention is applicable to hand-operating welding machine having external characteristics of constant current, which requires a feedback of current level. The current sampling device of the welding machine is a flow divider, which is of low cost and fast response.

Figure 6:
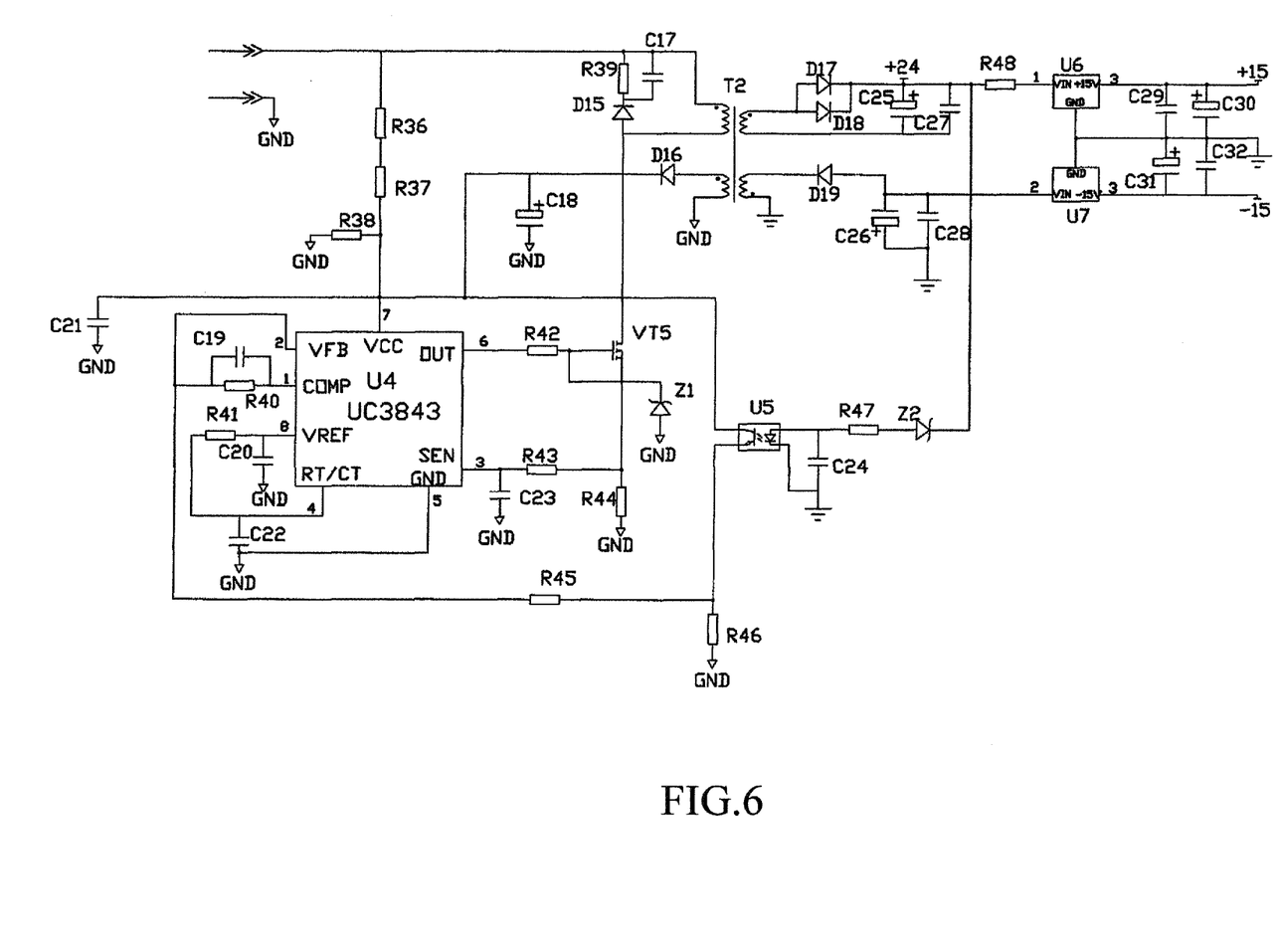
FIG. 6 is a circuit diagram of an auxiliary power supply circuit shown in FIG. 1

FIG. 6 shows the auxiliary power supply circuit, which provides a low voltage direct current power supply for the control circuit. The present invention uses a single-end flyback switching power supply as the auxiliary power supply.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:
1. A portable IGBT (Insulated Gate Bipolar Transistor) inverter arc welding machine, comprising:
   a main circuit to which a control circuit and an auxiliary power supply circuit are connected;
   the main circuit comprising, in sequence, an input rectifier filter circuit, an inverter circuit, a high-frequency primary transformer, and a secondary output rectifier circuit, the main circuit being adapted to rectify 50 Hz alternate current of electric main to form a direct current, which is then inverted into a high-frequency alternate current and further subjected to secondary rectification to form a direct current for welding operation;
   the control circuit comprising a pulse width modulator (PWM) regulation circuit, an IGBT driving circuit, a current feedback circuit, and a current setup circuit, a user setting of welding current being current setup, the current setup being fed, together with a current feedback signal that is sampled through a flow divider, to a current regulator for comparison to provide a voltage difference therebetween, the voltage difference controlling the PWM regulation circuit to generate a pulse signal of a given width, the pulse being sent to the IGBT driving circuit to drive IGBTs of the main circuit, whereby a welding current can be supplied from the main circuit, and characterized in that
   the inverter circuit is formed of a full-bridge hard switching structure, wherein the IGBTs constitute bridge arms that are sequentially conducted, so that their alternating conduction converts direct current into high frequency square wave alternating current, which flows through the high-frequency primary transformer and is then subjected to rectification to supply an output of low voltage direct current, each IGBT being connected in parallel to a resistor and a capacitor, which constitute a peak voltage absorption circuitry;
   the high-frequency primary transformer provides functions of power transmission and electrical isolation in the circuit, the high-frequency primary transformer comprising a microcrystalline alloy ferrite core, high voltage and high temperature resistance insulation layer being provided between primary and secondary sides; and
   the PWM regulation circuit comprises a dual output current control type pulse width modulator chip.
2. The portable IGBT inverter arc welding machine according to claim 1, wherein the IGBT driving circuit is in connection between the IGBTs and the control circuit and realizes isolation, magnification, and protection for PWM signals.

* * * * *